(12) United States Patent
Martin et al.

(10) Patent No.: US 11,949,287 B2
(45) Date of Patent: Apr. 2, 2024

(54) CONSOLIDATED STATOR LAMINATIONS

(71) Applicant: ABB Schweiz AG, Baden (CH)

(72) Inventors: William E. Martin, Greenville, SC (US); Stephen T. Evon, Easley, SC (US); Jerry L. Martin, Gainesville, GA (US); Barron D. Grant, Gainesville, GA (US); John M. Zedek, Simpsonville, SC (US)

(73) Assignee: ABB Schweiz AG, Baden (CH)

( * ) Notice: Subject to any disclaimer, the term of this patent is extended or adjusted under 35 U.S.C. 154(b) by 183 days.

(21) Appl. No.: 17/388,811

(22) Filed: Jul. 29, 2021

(65) Prior Publication Data
US 2023/0034953 A1   Feb. 2, 2023

(51) Int. Cl.
*H02K 1/20* (2006.01)
*H02K 5/18* (2006.01)
*H02K 5/20* (2006.01)
*H02K 15/02* (2006.01)
*H02K 15/14* (2006.01)

(52) U.S. Cl.
CPC ........... *H02K 1/20* (2013.01); *H02K 5/18* (2013.01); *H02K 5/203* (2021.01); *H02K 5/207* (2021.01); *H02K 15/028* (2013.01); *H02K 15/14* (2013.01)

(58) Field of Classification Search
CPC .......... H02K 1/185; H02K 5/18; H02K 5/203; H02K 15/14; H02K 5/207; H02K 1/20; H02K 1/16; H02K 15/028
See application file for complete search history.

(56) References Cited

U.S. PATENT DOCUMENTS

| | | | |
|---|---|---|---|
| 7,808,136 B2 * | 10/2010 | Knauff | H02K 1/20 310/227 |
| 9,496,770 B2 * | 11/2016 | Grillenberger | H02K 1/20 |
| 2006/0284511 A1 * | 12/2006 | Evon | H02K 9/14 310/58 |

FOREIGN PATENT DOCUMENTS

| CN | 106655649 A | * | 5/2017 |
|---|---|---|---|
| EP | 3070815 A1 | * | 9/2016 |
| JP | 58-121144 U | | 8/1983 |

(Continued)

OTHER PUBLICATIONS

European Patent Office, Extended European Search Report in European Patent Application No. 22187875.4, 9 pp. (dated Dec. 20, 2022).

*Primary Examiner* — Leda T Pham
(74) *Attorney, Agent, or Firm* — Leydig, Voit & Mayer, Ltd.

(57) ABSTRACT

This disclosure provides a consolidated electric motor stator lamination for multiple enclosure types such that a single stator assembly can be used for different classifications of an electric motor. Each layer of the stator lamination includes external features that, when combined with the external features of the other layers in the lamination, can be adapted to conform the electric motor to one of a plurality of enclosure types. The external features include retaining features for one or more covers, fins, and a profile configured to accept cooling tubes. In various embodiments, a single consolidated stator lamination assembly can be adapted to provide a motor having at least two of an open-drip proof (ODP), a totally enclosed fan cooled (TEFC), or a totally enclosed water cooled (TEWC) enclosure classification.

19 Claims, 9 Drawing Sheets

(56) References Cited

FOREIGN PATENT DOCUMENTS

JP           6303284 B2    4/2018
WO    WO-2005022718 A1  *  3/2005  ............. H02K 1/185

* cited by examiner

CONSOLIDATED STATOR LAMINATIONS

BACKGROUND

Electric motors are used extensively in industrial applications and commercial products. For example, electric motors are used extensively in control systems for industrial manufacturing equipment, electric vehicles, and commercial products such as heating, ventilation, and air conditioning (HVAC) systems. The National Electrical Manufacturers Association (NEMA) publishes various standard documents related to electric motors to ensure that motors manufactured by different manufacturers meet certain design constraints that enable different motors to be swapped in a particular application. For example, NEMA publishes standards related to electric motor insulation classes, frame assignments, and motor enclosures. As an alternative to the NEMA standards, the International Electrotechnical Commission (IEC) also publishes electric motor standards that may be used in different parts of the world.

The NEMA standards (e.g., NEMA MG 1-2016 1.25-1.27) define a number of motor enclosure types including, but not limited to, Open Drip-Proof (ODP), Totally Enclosed Fan Cooled (TEFC), and Totally Enclosed Water-Cooled (TEWC). Each of these enclosure types are characterized by different classifications of environmental protection. Conventional motors of different types were typically manufactured using different motor chassis or motor housings.

An electric motor typically includes the following components: a rotor coupled to a motor shaft; and a stator. The stator is typically wound with insulated wire to produce a magnetic field. The rotor produces a rotating magnetic field using, e.g., permanent magnets attached to a rotating shaft or additional windings of insulated wire or rotor bars with endrings. A stator may be manufactured by forming a core material (e.g., Iron-alloys, electrical steel, etc.) into a hollow cylinder and then winding the insulated wire around slots in the internal surface of the cylinder. The stator is then inserted in a motor housing, which forms the external enclosure of the motor. Different motor housings may be used for the different enclosure types.

A stator that is manufactured from a solid billet of material may be associated with large losses caused by eddy currents that are generated in the stator core material. Thus, stators are not typically manufactured by machining a solid billet of material into the form of the stator. Instead, in order to reduce the losses from eddy currents, stators are typically manufactured using a lamination technique. For example, a shape of the stator is first punched out of a sheet material, such as 24 gauge or 26 gauge steel. The layers of the lamination may then be coated with a dielectric material and assembled to form the stator lamination assembly. The stator lamination assembly can be held together with an adhesive material, rivets, and/or through-bolts. In some embodiments, the layers of the lamination are oxidized to form a dielectric layer (i.e., an oxide layer) and then stacked and held together with rivets that pass through locating holes in each layer of the lamination. The rivets may also be coated with a dielectric material or oxidized to prevent eddy currents from conducting between the lamination layers through the rivets.

In some motors, the stator lamination assembly can also serve as the motor housing, such that the stator does not need to be retained in a separate housing component. The features of the housing can be formed in an external profile of the lamination layer and the slots for the stator windings can be formed in an internal profile of the lamination layer. Consequently, once the stator lamination assembly is formed, the electric motor constructed therewith conforms with one of the particular enclosure types.

However, there are a large number of motors manufactured for different applications, providing different sizes/horsepower ratings and different enclosure types for different environmental conditions. Manufacturers typically need to make different components for each of the different products they offer, which can lead to increased tooling costs and increased storage costs for the various inventory. Thus, solutions to reduce costs while allowing manufacturers to continue to offer a robust set of products are needed.

SUMMARY

A consolidated electric motor stator lamination for multiple enclosure types is disclosed herein. A layer of the stator lamination includes external features that, when combined with the external features of the other layers in the lamination, can be adapted to conform the electric motor to one of a plurality of enclosure types. In various embodiments, a single consolidated stator lamination assembly can be adapted to provide a motor having at least two of an open-drip proof (ODP), a totally enclosed fan cooled (TEFC), or a totally enclosed water cooled (TEWC) enclosure classification.

In accordance with a first aspect of the present disclosure, a stator for an electric motor is disclosed. The stator includes: a lamination including a plurality of layers, and coils of insulated conductors. Each layer of the plurality of layers has an inner profile and an outer profile and is formed from a sheet of material having a nominal thickness. The inner profiles corresponding to the plurality of layers, when assembled into the lamination, form slots dispersed around a hole configured to accept a rotor, and the outer profiles corresponding to the plurality of layers, when assembled into the lamination, include a number of features on an exterior surface of the lamination that enable the electric motor to be configured in accordance with a plurality of enclosure types. The coils of insulated conductors are distributed in the slots of the lamination and used to generate a magnetic field associated with the stator.

In accordance with some embodiments of the first aspect, the plurality of enclosure types includes at least one of: an open-drip proof (ODP) enclosure type; a totally enclosed fan-cooled (TEFC) enclosure type; or a totally enclosed water-cooled (TEWC) enclosure type.

In accordance with some embodiments of the first aspect, the sheet of material comprises silicon steel or alloys thereof having an oxide layer formed on at least one surface.

In accordance with some embodiments of the first aspect, the number of features on the exterior surface of the lamination includes a plurality of fins. A shape of the exterior surface of the lamination between a base of a first fin and a base of a second fin conforms to at least a portion of a shape of a cross-section of a cooling tube. In at least one embodiment, the shape of the exterior surface of the lamination between the base of the first fin and the base of the second fin is a curve having a radius that matches a radius of an exterior surface of the cooling tube. In at least one embodiment, the shape of the exterior surface of the lamination between the base of the first fin and the base of the second fin has a number of facets that matches a rectangular cross-section of the cooling tube.

In accordance with some embodiments of the first aspect, the number of features on the exterior surface of the lamination includes a retaining feature configured to accept a cover. In at least one embodiment, the retaining feature includes a pair of features in the outer profile that are mirrored across a line that intersects a central axis of the stator and passes through an axis of a through-hole in the lamination, and the lamination includes a number of through holes used to mount end plates to the lamination to form a motor housing.

In accordance with some embodiments of the first aspect, the cover comprises a base material covered in an elastomeric material. The base material comprises one of a metal, a plastic, or a composite material.

In accordance with some embodiments of the first aspect, the number of features on the exterior surface of the lamination includes a plurality of pairs of retaining features disposed around a central axis of the stator each pair of retaining features configured to accept a particular cover of two or more covers.

In accordance with a second aspect of the present disclosure, an electric motor is disclosed. The electric motor includes: a stator, a rotor, and one or more end plates. The stator includes: a lamination including a plurality of layers, and coils of insulated conductors. Each layer of the plurality of layers has an inner profile and an outer profile and comprises a sheet of material having a nominal thickness. The inner profiles corresponding to the plurality of layers, when assembled into the lamination, form slots dispersed around a hole, and the outer profiles corresponding to the plurality of layers, when assembled into the lamination, include a number of features on an exterior surface of the lamination that enable the electric motor to be configured in accordance with a plurality of enclosure types. The coils of insulated conductors are distributed in the slots of the lamination and used to generate a magnetic field associated with the stator. The rotor is disposed in the hole in the lamination of the stator, the rotor coupled to a motor shaft. The one or more end plates are coupled to the lamination of the stator to form a motor housing.

In accordance with some embodiments of the second aspect, the plurality of enclosure types includes an open-drip proof (ODP) enclosure type. Being configured in accordance with the ODP enclosure type, the electric motor further includes: a blower attached to at least one end plate of the one or more end plates; and at least one cover disposed on the exterior surface of the lamination of the stator. Each cover in the at least one cover is retained by a retaining feature included in the number of features on the exterior surface of the lamination, and the blower is configured to force air between the cover and a plurality of fins included in the number of features on the exterior surface of the lamination.

In accordance with some embodiments of the second aspect, the plurality of enclosure types includes a totally enclosed fan-cooled (TEFC) enclosure type. Being configured in accordance with the TEFC enclosure type, the electric motor further includes: a fan coupled to the motor shaft. The fan is disposed within a shroud coupled to one of the one or more end plates and configured to force air from the fan between a plurality of fins included in the number of features on the exterior surface of the lamination.

In accordance with some embodiments of the second aspect, the plurality of enclosure types includes a totally enclosed water-cooled (TEWC) enclosure type. Being configured in accordance with the TEWC enclosure type, the electric motor further includes: a plurality of cooling tubes. The number of features on the exterior surface of the lamination includes a plurality of fins and each cooling tube in the plurality of cooling tubes is disposed between a base of a first fin and a base of a second fin in the plurality of fins.

A shape of the profile of the exterior surface of the lamination between the base of the first fin and the base of the second fin conforms to at least a portion of a shape of a cross-section of the cooling tube.

In accordance with some embodiments of the second aspect, the sheet of material comprises silicon steel or alloys thereof having an oxide layer formed on at least one surface.

In accordance with some embodiments of the second aspect, the number of features includes a retaining feature configured to accept a cover. The cover includes a base material covered in an elastomeric material, and the base material is one of a metal, a plastic, or a composite material. In at least one embodiment, the retaining feature comprises a pair of features in the outer profile of each layer that are mirrored across a line that intersects a central axis of the stator and passes through an axis of a particular through-hole in a plurality of through-holes formed in the lamination.

In accordance with a third aspect of the present disclosure, a method for manufacturing an electric motor is disclosed. The method includes: forming a plurality of layers in a sheet of material, assembling the plurality of layers to form a stator lamination assembly, placing coils of insulated conductors in slots of the stator lamination assembly, assembling the stator lamination assembly with one or more end plates and a rotor; and configuring the electric motor to conform to one of a plurality of motor enclosure types. Each layer of the plurality of layers has an inner profile and an outer profile and comprises a sheet of material having a nominal thickness. The inner profiles corresponding to the plurality of layers, when assembled into the stator lamination assembly, form slots dispersed around a hole configured to accept the rotor, and the outer profiles corresponding to the plurality of layers, when assembled into the stator lamination assembly, include a number of features on an exterior surface of the stator lamination assembly that enable the electric motor to be configured in accordance with the plurality of enclosure types. The rotor is disposed in the hole of the stator lamination assembly to form the electric motor.

In accordance with some embodiments of the third aspect, the plurality of enclosure types comprises an open-drip proof (ODP) enclosure type. Configuring the electric motor to conform to one of the plurality of motor enclosure types includes: configuring the electric motor to conform to the ODP enclosure type by adding at least one cover to the electric motor. Each cover in the at least one cover is retained by a retaining feature comprising a pair or features on the exterior surface of the stator lamination assembly.

In accordance with some embodiments of the third aspect, the plurality of enclosure types comprises totally enclosed water-cooled (TEWC) enclosure type. Configuring the electric motor to conform to one of the plurality of motor enclosure types includes: configuring the electric motor to conform to the TEWC enclosure type by attaching at least one cooling tube to the stator lamination assembly. Each cooling tube in the at least one cooling tube is disposed between a base of a first fin and a base of a second fin in a plurality of fins included in the number of features on the exterior surface of the stator lamination assembly, and a shape of the exterior surface of the stator lamination assembly between a base of a first fin and a base of a second fin conforms to at least a portion of a shape of a cross-section of a cooling tube.

DETAILED DESCRIPTION

A new design for a stator lamination assembly (alternately referred to as a lamination or stator lamination) is disclosed herein that enables the resulting stator lamination assembly to be utilized in electric motors that conform to multiple different motor enclosure types. Conventional stator laminations were designed such that the outer profile of the stator was featureless (e.g., circular or square) and the stator could be inserted into a separate motor housing that included the features of a particular motor enclosure type, or where the outer profile of the stator was designed according to a particular motor enclosure type such that the stator lamination provided the functionality of the motor housing. However, such designs were limited to a single motor enclosure type such that different laminations were used for different enclosure types.

This causes manufacturers to maintain larger inventories of parts to provide for different motor configurations as well as develop different tool sets (e.g., cutting dies) for each of the different lamination shapes. Warehousing larger sets of inventories and maintaining multiple sets of tools for different configurations of the same basic electric motor increases the costs of manufacturing said components.

The following disclosure describes a consolidated stator lamination assembly that includes a number of features formed in the outer profile of the layers of the lamination such that the same stator component of an electric motor can be configured in accordance with multiple motor enclosure types. The number of features includes a plurality of fins used for cooling the motor when the motor is configured in conformance with a totally enclosed fan-cooled (TEFC) enclosure type. The shape of the outer profile of each layer between two adjacent fins is designed to conform to a cross-sectional shape of a cooling tube that can be inserted between the fins in order to configure the motor in conformance with a totally enclosed water-cooled (TEWC) enclosure type. Finally, the number of features also includes at least one retaining feature. Each retaining feature can be used to secure a cover to the stator lamination assembly in order to configure the motor in conformance with an open-drip proof (ODP) enclosure type.

Figure 1:
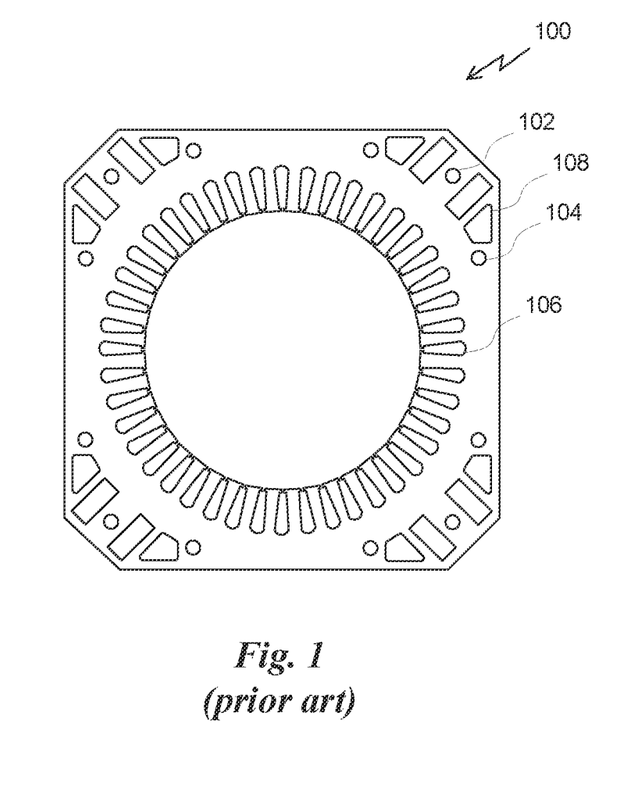
FIG. 1 illustrates a layer of a lamination assembly for a stator of an electric motor corresponding to an open-drip proof (ODP) enclosure type, in accordance with the prior art.

FIG. 1 illustrates a layer 100 of a lamination assembly for a stator of an electric motor corresponding to an open-drip proof (ODP) enclosure type, in accordance with the prior art. The outer profile of the layer 100 is substantially square in shape with beveled edges at the four corners. The layer 100 also includes a number of through-holes 102 and/or a number of rivet holes 104 used to secure a plurality of layers to form a lamination core (which may be referred to as a stator lamination assembly). An inner profile of the layer 100 includes a hole designed to accept a rotor. A number of slots 106 are formed around the edge of the hole. The slots 106 are configured to accept coils of insulated conductors that form electromagnets that generate the magnetic field associated with the stator of the electric motor. The layer 100 may also include passages 108 that can be used to force air through the lamination in order to cool the electric motor.

Figure 2:
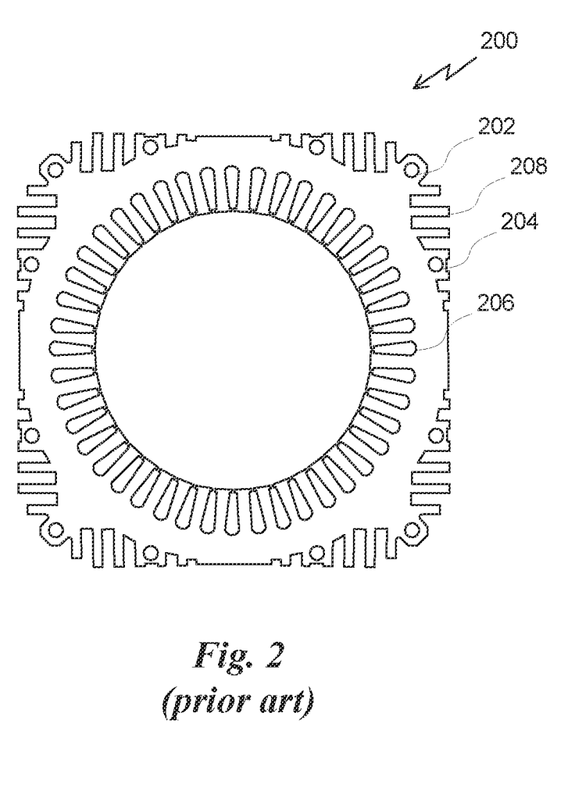
FIG. 2 illustrates a layer of a lamination assembly for a stator of an electric motor corresponding to a totally enclosed fan-cooled (TEFC) enclosure type, in accordance with the prior art.

FIG. 2 illustrates a layer 200 of a lamination assembly for a stator of an electric motor corresponding to a totally enclosed fan-cooled (TEFC) enclosure type, in accordance with the prior art. Similar to the layer 100, the layer 200 includes a number of through-holes 202 and/or a number of rivet holes 204, as well as a hole for the rotor with slots 206 dispersed around the edge of the hole. However, unlike layer 100, the outer profile of the layer is not featureless and includes a number of fins 208. Rather than pass air through the passages 108 of the lamination in the ODP configuration, in the TEFC configuration, air is blown across the exterior surface of the lamination (i.e., between the fins 208) in order to cool the motor.

It will be appreciated that the stator lamination assembly resulting from the combination of a plurality of layers 100 is not suitable for use with the TEFC enclosure type, and the stator lamination assembly resulting from the combination of a plurality of layers 200 is not suitable for use with the ODP enclosure type. Thus, two sets of tools and two different sets of part inventories must be maintained by the manufacturer in order to offer different products conforming with these two different motor enclosure types (i.e., classifications). Maintaining separate inventories and separate tooling for multiple components having different configurations can increase costs and, therefore, there is a desire to consolidate the different designs.

Figure 3:
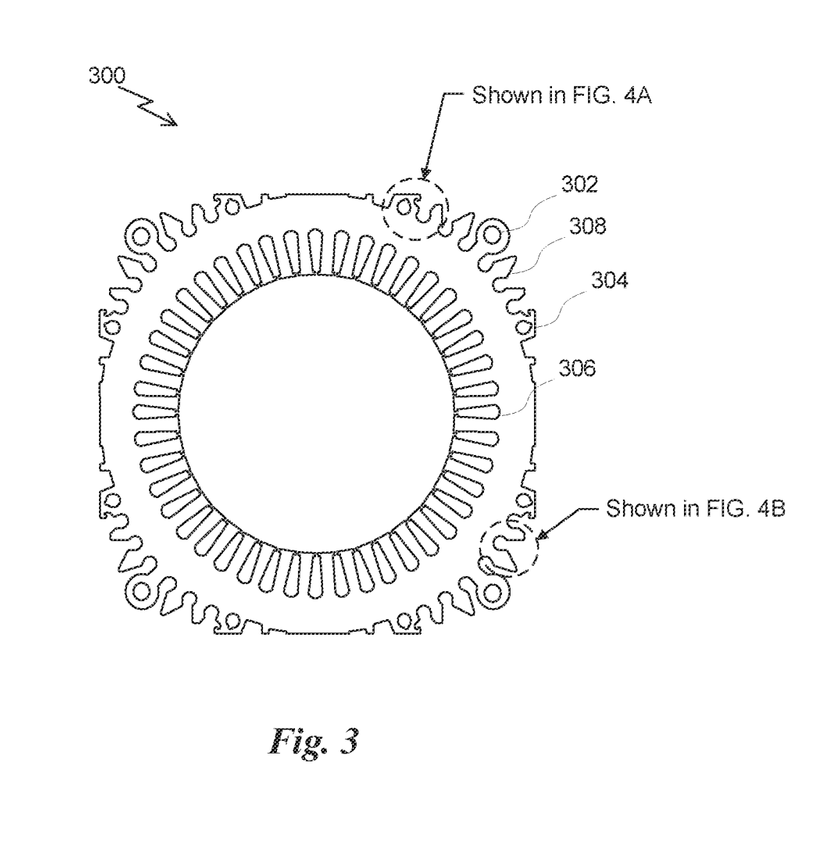
FIG. 3 illustrates a layer of a lamination assembly for a stator of an electric motor corresponding to multiple enclosure types, in accordance with some embodiments.

FIG. 3 illustrates a layer 300 of a lamination assembly for a stator of an electric motor corresponding to multiple enclosure types, in accordance with some embodiments. The outer profile of the layer 300 includes a number of through-holes 302 and/or a number of rivet holes 304 used to secure a plurality of layers to form a lamination. An inner profile of the layer 300 includes a hole designed to accept a rotor. A number of slots 306 are formed around the edge of the hole. The slots 306 are configured to accept coils of insulated conductors that form electromagnets that generate the magnetic field associated with the stator of the electric motor. The insulated conductors are wound between multiple slots to form coils around the material between slots, which forms the core of an electromagnet. The layer may be formed of a ferrous material, such as electrical steel (e.g., silicon steel) or alloys thereof.

An outer profile of the layer 300 includes a number of features associated with different enclosure types. First, the outer profile of the layer 300 includes a number of fins 308, which increases the surface area of the stator lamination assembly in order to provide efficient heat transfer in a totally enclosed fan-cooled (TEFC) enclosure type. A fan, blower, or the like can be mounted to one end of the motor and configured to blow air over the fins 308 to keep the motor operating temperature within acceptable limits.

Figure 4A:
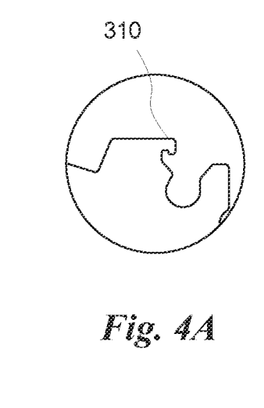
FIGS. 4A-4B show detailed views of features of the outer profile of the layer of FIG. 3, in accordance with some embodiments.

Second, as shown in more detail in FIG. 4A, the outer profile of the layer 300 includes a retaining feature 310 used to secure a cover to the external surface of the stator lamination assembly. In an embodiment, the retaining feature 310 comprises a pair of features in the outer profile that are mirrored across a line that intersects a central axis of the stator (i.e. a center axis of the hole for the rotor), and passes through an axis of a through-hole 302 in the lamination. The pair of features is designed to allow a cover to be inserted into a recess in the surface of the retaining feature, the recess acting to maintain the cover in a location adjacent the outer profile of the stator lamination assembly. In an embodiment, the cover is made of a sheet metal of sufficient thickness to allow the cover to be deformed while being inserted into the retaining feature 310 and, once released, the cover at least partially springs back to its original shape and applies a pressure against the retaining feature based on the elastic deformation. By securing one or more covers to the outside surface of the stator lamination assembly, the electric motor can be configured to conform with an open-drip proof (ODP) enclosure type. A space between the covers and the outer surface of the stator lamination assembly, at least partially enclosing the fins 308 in an interior space between the outer surface of the stator lamination assembly and the cover, provides a similar function to the passages 108 of the layer 100 and reduces the chance that debris from the environment is deposited between the fins. In some embodiments, air blown between the cover and the fins 308 can be passed through a filter to remove large debris before it is blown over the motor.

Figure 4B:
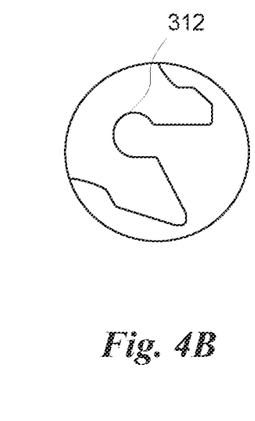

Third, as shown in more detail in FIG. 4B, the outer profile of the layer 300 is designed to accept cooling tubes when configured as an electric motor that conforms to a totally enclosed water-cooling (TEWC) enclosure type. In an embodiment, a shape 312 of the outer profile of the layer 300 between a base of a first fin and a base of a second fin conforms to at least a portion of a shape of a cross-section of a cooling tube. In an embodiment, the shape 312 of the outer profile is a curve having a radius that matches a circular cross-section of the cooling tube. Circular tubing (e.g., copper tubes) can be inserted into the space at the base of the fins and retained by the shape 312. In an embodiment, the profile at the base of the fins is sufficient to allow the tubes to be snapped into place. In another embodiment, the profile at the base of the fins is sufficient to allow the tubes to be inserted along a length of the lamination such as prior to securing motor end plates to the ends of the stator lamination assembly.

It will be appreciated that the shape of the cooling tubes in a TEWC enclosure type configuration are not limited to circular tubes and that tubes of other shape (e.g., square, rectangular, triangular, etc.) may be used instead of circular tubes. In such embodiments, the shape 312 of the outer profile of the layer 300 between a base of a first fin and a base of a second fin can include a number of facets that matches a cross-section of the cooling tube. For example, the facets can match the length of one or more sides of a square or rectangular cross-section of the cooling tube.

Figure 5:
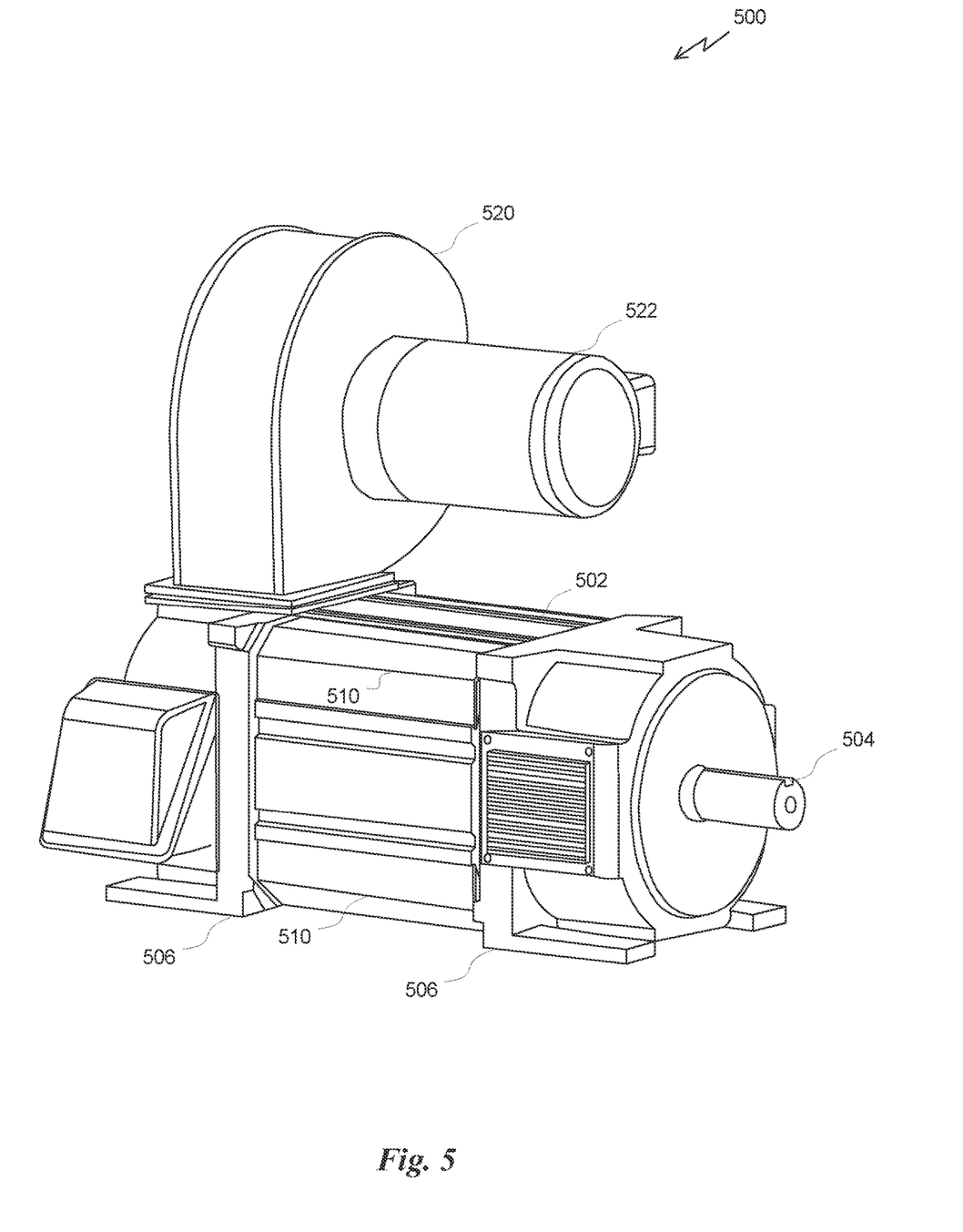
FIG. 5 illustrates an electric motor that conforms with an open-drip proof (ODP) enclosure type, in accordance with one embodiment.

FIG. 5 illustrates an electric motor 500 that conforms with an open-drip proof (ODP) enclosure type, in accordance with one embodiment. As depicted in FIG. 5, the electric motor 500 includes a consolidated stator lamination assembly 502 formed by stacking a plurality of layers 300. In an embodiment, the plurality of layers 300 are secured using a number of rivets (not explicitly shown) disposed in the rivet holes 304 in each of the layers 300. Internally, the lamination is combined with coils of insulated conductors (e.g., insulated copper wires) dispersed in the slots 306 of the lamination to form a stator of the electric motor, and a rotor is disposed inside the hole at the center of the stator to form the basic components of the electric motor. The rotor is connected to the motor shaft 504, and end plates 506 may be connected to the consolidated stator lamination assembly using bolts that are disposed in the through-holes 302 of the layers of the stator lamination assembly 502.

In order to configure the electric motor to conform with the ODP enclosure type, four covers 510 are secured, via the retaining features 310, to the external surface of the consolidated stator lamination assembly 502. The end plates are designed to force air from a blower 520 attached to an electric blower motor 522 through the space formed between the outer surface of the consolidated stator lamination assembly 502 and each of the covers 510. It will be appreciated that at least a portion of the fins 308 are disposed in this space and that the air from the blower cools the electric motor by passing air over these fins and out through an opening formed in one end plate 506. Optionally, the opening to the blower and/or the opening in the end plate can include a grate and/or a filter used to prevent dust or other debris from getting into the space between the consolidated stator lamination assembly 502 and the covers 510.

In various embodiments, the covers 510 are formed from metal (e.g., steel), plastic, or composite material (e.g., glass infused resin, carbon fiber and resin, etc.). In some embodiments, the covers may also be coated in a heat-resistant elastomeric material such as neoprene rubber. Such a coating may help secure the covers in the retaining feature while being able to withstand hot temperatures of the surface of the electric motor 500.

It will be appreciated that the covers enable an electric motor assembled with a stator lamination assembly 502 that is designed to include fins in accordance with a TEFC enclosure type to be converted into an electric motor that conforms with an ODP enclosure type. This allows the use of one design for the lamination profile to be used with multiple motor enclosure types. This can reduce the tooling that is required to be procured and maintained by the manufacturer, thereby reducing the overall cost for offering electric motors that conform with multiple enclosure type classifications.

Although a profile of a stator lamination assembly having retaining features for four covers is shown in FIG. 5, it will be appreciated that different embodiments can include more or fewer covers. For example, a profile that uses two covers that wrap around three sides of the stator could be used instead of four covers that are attached at the corners of the lamination and only wrap around two sides, as shown in FIG. 5. In other embodiments, where the profile of the stator lamination assembly is of a substantially hexagonal shape instead of a substantially square shape, six covers may be used instead. The number of covers used depends on the choice of profile used for the stator lamination and the number of retaining features incorporated therein.

Figure 6:
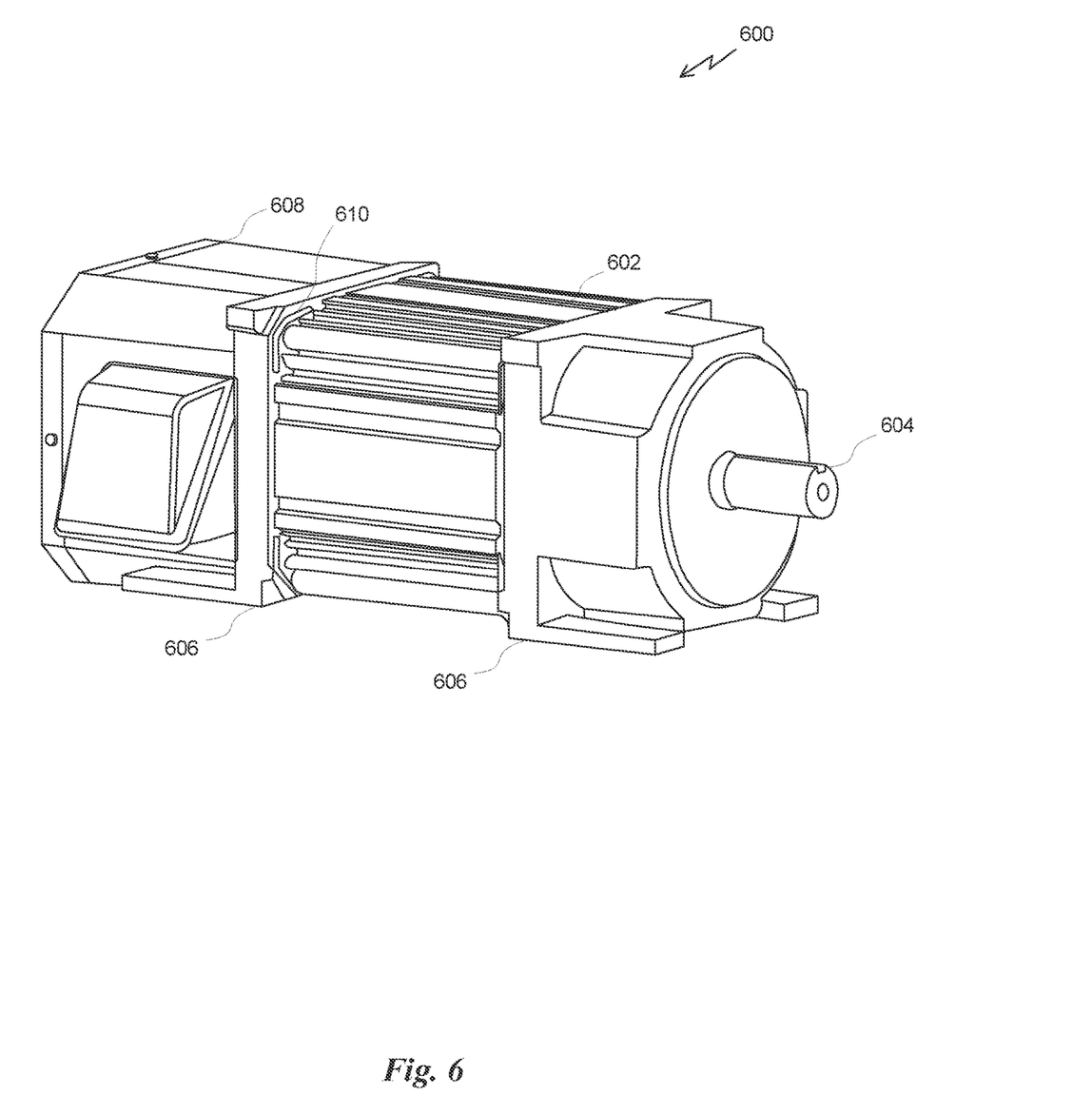
FIG. 6 illustrates an electric motor that conforms with a totally enclosed fan-cooled (TEFC) enclosure type, in accordance with one embodiment.

FIG. 6 illustrates an electric motor that conforms with a totally enclosed fan-cooled (TEFC) enclosure type, in accordance with one embodiment. As depicted in FIG. 6, the electric motor 600 includes a consolidated stator lamination assembly 602 that is the same as the consolidated stator lamination assembly 502 used in the electric motor 500. However, in order to configure the electric motor 600 to conform with a TEFC enclosure type, different end plates 606 are attached to the stator lamination assembly 602. Although not explicitly shown in FIG. 6, a fan can be attached to one end plate 606 (shown opposite the motor shaft 604) and covered in a shroud 608 (e.g., a fan housing) that allows the fan to blow air through holes 610 in the end plate 606 and across the fins 308 on the external surface of the consolidated stator lamination assembly.

It will be appreciated that covers are not secured to the consolidated stator lamination assembly 602, as in the ODP enclosure type. By omitting the covers and attaching different style end plates 606 to the basic components (e.g., stator assembly, rotor, motor shaft) of the electric motor 500, the electric motor 600 conforms with the TEFC enclosure type rather than the ODP enclosure type of electric motor 500.

Figure 7:
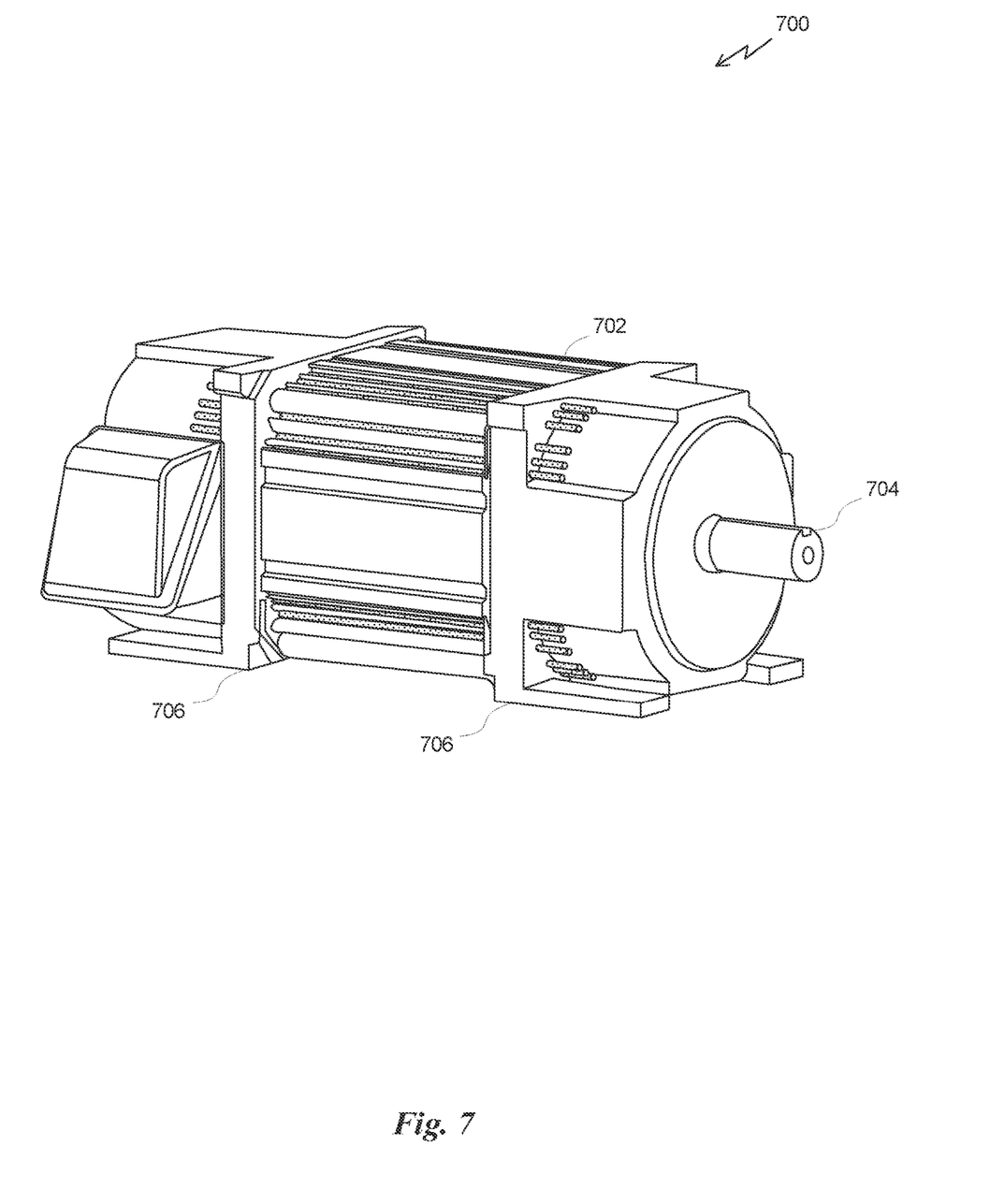
FIG. 7 illustrates an electric motor that conforms with a totally enclosed water-cooled (TEWC) enclosure type, in accordance with one embodiment.

FIG. 7 illustrates an electric motor that conforms with a totally enclosed water-cooled (TEWC) enclosure type, in accordance with one embodiment. As depicted in FIG. 7, the electric motor 700 includes the consolidated stator lamination assembly 702, which is similar to consolidated stator lamination assemblies 502 & 602 used in the electric motors 500 & 600, respectively. However, in order to configure the electric motor 700 to conform with a TEWC enclosure type, different end plates 706 are attached to the stator lamination assembly 702. In addition, cooling tubes 710 such as copper tubes having a circular cross-section are inserted into the corresponding recesses in between fins 308 of the consolidated stator lamination assembly 702. Although not explicitly shown in FIG. 7, a pump can be connected to the cooling tubes to circulate a coolant (e.g., water, water/glycol solution, etc.) through the cooling tubes. The pump can be connected to the cooling tubes 710 using a variety of means commonly used in the art such as through flare fittings, by brazing a fitting to the cooling tubes, by installing push fittings on the ends of the cooling tubes 710 and connecting the pump to the push fittings with flexible tubing, or via a manifold. In an embodiment, at least one end plate 706 can incorporate a manifold into the structure of the end plates 706 of the electric motor 700, such that the pump is connected to the manifold via one fitting to feed coolant through a plurality of cooling tubes and return effluent to a heat exchanger (e.g., a radiator). It will be appreciated that any number of cooling tubes 710 disposed in the recesses between the fins 308 can be used in the configuration of the electric motor 700 corresponding to the TEWC enclosure type.

In an embodiment, the pump is incorporated into one of the end plates (e.g., the end plate opposite the motor shaft 704) and a connector attached to the end plate 706 is connected to a coolant reservoir (e.g., a coolant source). The coolant is pumped through the cooling tubes and exits from a second connector attached to the other end plate 706 or, alternatively, is routed back to the opposite end of the motor 700 via a second subset of cooling tubes such that the input and output lines for the coolant are attached to the same end plate 706. The pump may be attached to the motor shaft 704 such that the pump operates with the motor 700.

It will be appreciated that covers are not required for the TEWC enclosure type and that the cooling tubes may be left exposed to the environment. However, by simply adding the cooling tubes (and a method to pump coolant through the tubes) and attaching different style end plates 706 to the basic components (e.g., stator assembly, rotor, motor shaft) of the electric motor 500, the electric motor 700 conforms with the TEWC enclosure type rather than the ODP enclosure type of electric motor 500 or the TEFC enclosure type of electric motor 600.

Figure 8A:
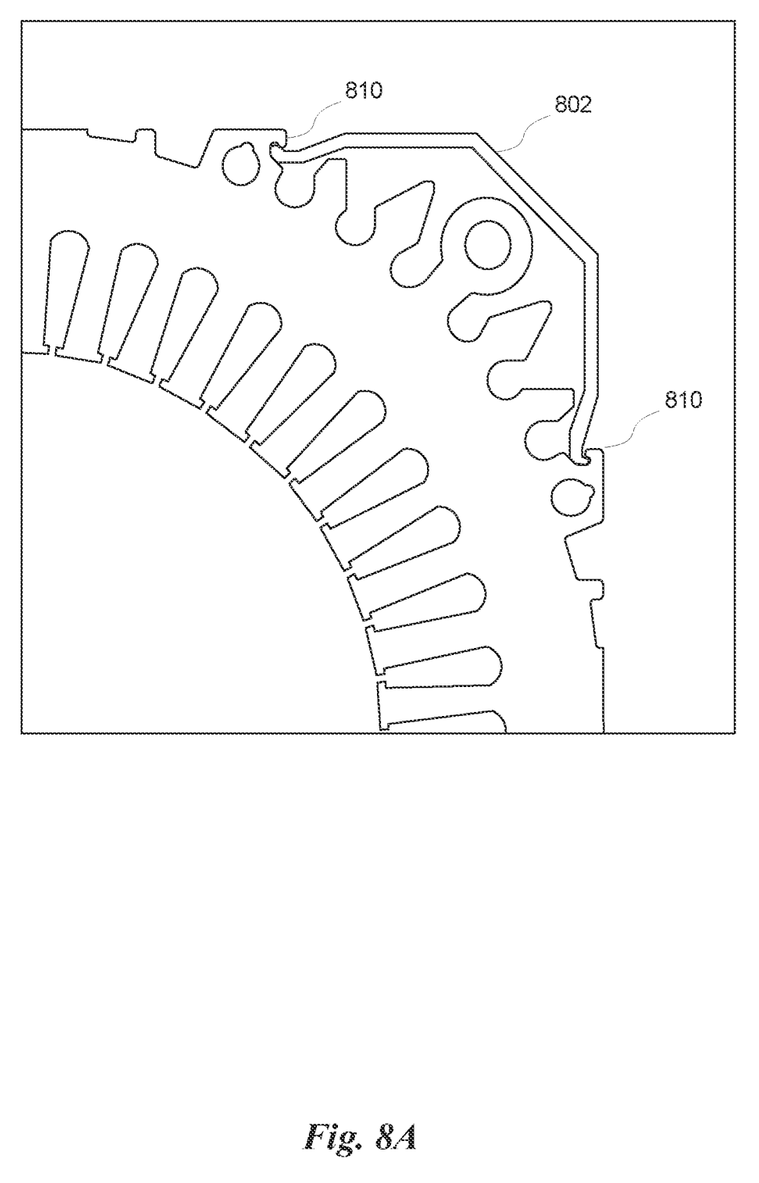
FIG. 8A illustrates a cover secured to the stator lamination assembly via a retaining feature, in accordance with one embodiment.

FIG. 8A illustrates a cover 802 secured to the stator lamination assembly via a retaining feature 810, in accordance with one embodiment. In some embodiments, the cover 802 is made of a composite of a base material such as metal (e.g., steel) or plastic covered in an elastomeric material such as neoprene rubber. The cover can also be made of a composite material such as a resin that includes a matrix of fiberglass or carbon fiber. In some embodiments, the base material of the cover 802 may also be covered with a dielectric material. For example, in an embodiment, the cover 802 is made of similar material as the layers of the stator lamination assembly (e.g., electrical steel/silicon steel) and then an oxide layer is formed on the surface of the material, where the oxide layer provides a dielectric material between the base metal of the cover and the base metal of any layer of the stator lamination assembly. The dielectric layers on the cover and/or layers of the lamination prevent eddy currents from passing through multiple layers of the lamination. Of course, in addition, the elastomeric material covering the oxide layer may also provide an insulating quality to the cover 802 and an extra layer of protection to reduce losses from eddy currents.

Figure 8B:
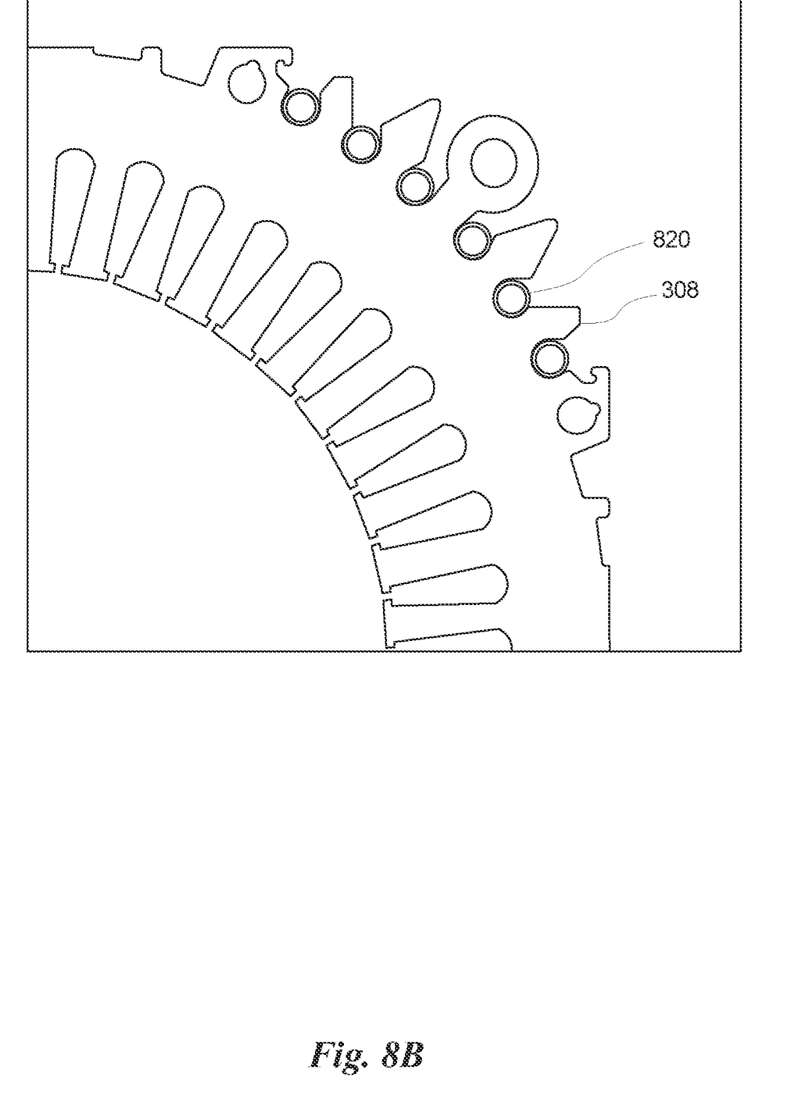
FIG. 8B illustrates cooling tubes inserted into the recesses between the fins of the stator lamination assembly, in accordance with some embodiments.

FIG. 8B illustrates cooling tubes 820 inserted into the recesses between the fins 308 of the stator lamination assembly, in accordance with some embodiments. As shown, there are six cooling tubes 820 located between opposing pairs of features in the retaining feature 810, providing a total of 24 cooling tubes located approximately at the four corners of the stator lamination assembly. The cooling tubes 820 have a cross-sectional shape being circular, and the shape of the exterior surface of the lamination between the base of a first fin and the base of a second fin is a curve having a radius that matches a radius of an exterior surface of the cooling tube 820.

Figure 8C:
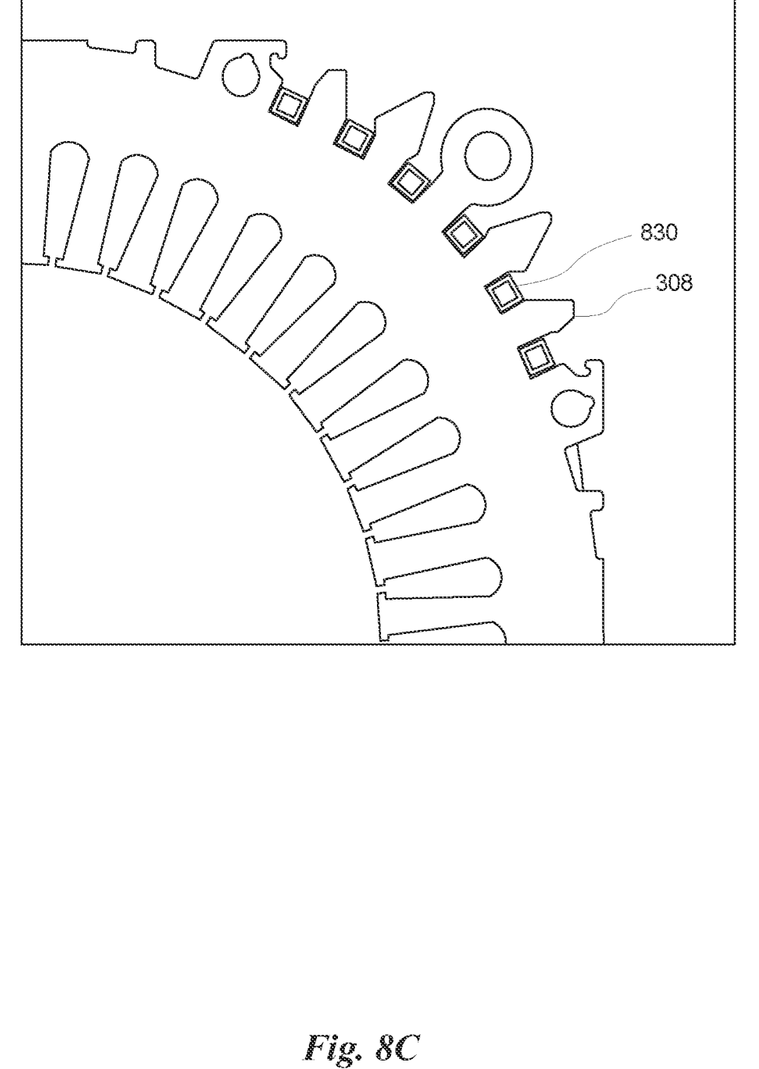
FIG. 8C illustrates cooling tubes inserted into the recesses between the fins of the stator lamination assembly, in accordance with some embodiments.

FIG. 8C illustrates cooling tubes 830 inserted into the recesses between the fins 308 of the stator lamination assembly, in accordance with some embodiments. As shown, there are six cooling tubes 830 located between opposing pairs of features in the retaining feature 810, providing a total of 24 cooling tubes located approximately at the four corners of the stator lamination assembly. The cooling tubes 830 have a cross-section shape being square or rectangular, and the shape of the exterior surface of the lamination between the base of a first fin and the base of a second fin has a number of facets that matches a rectangular cross-section of the cooling tube 830.

Figure 9:
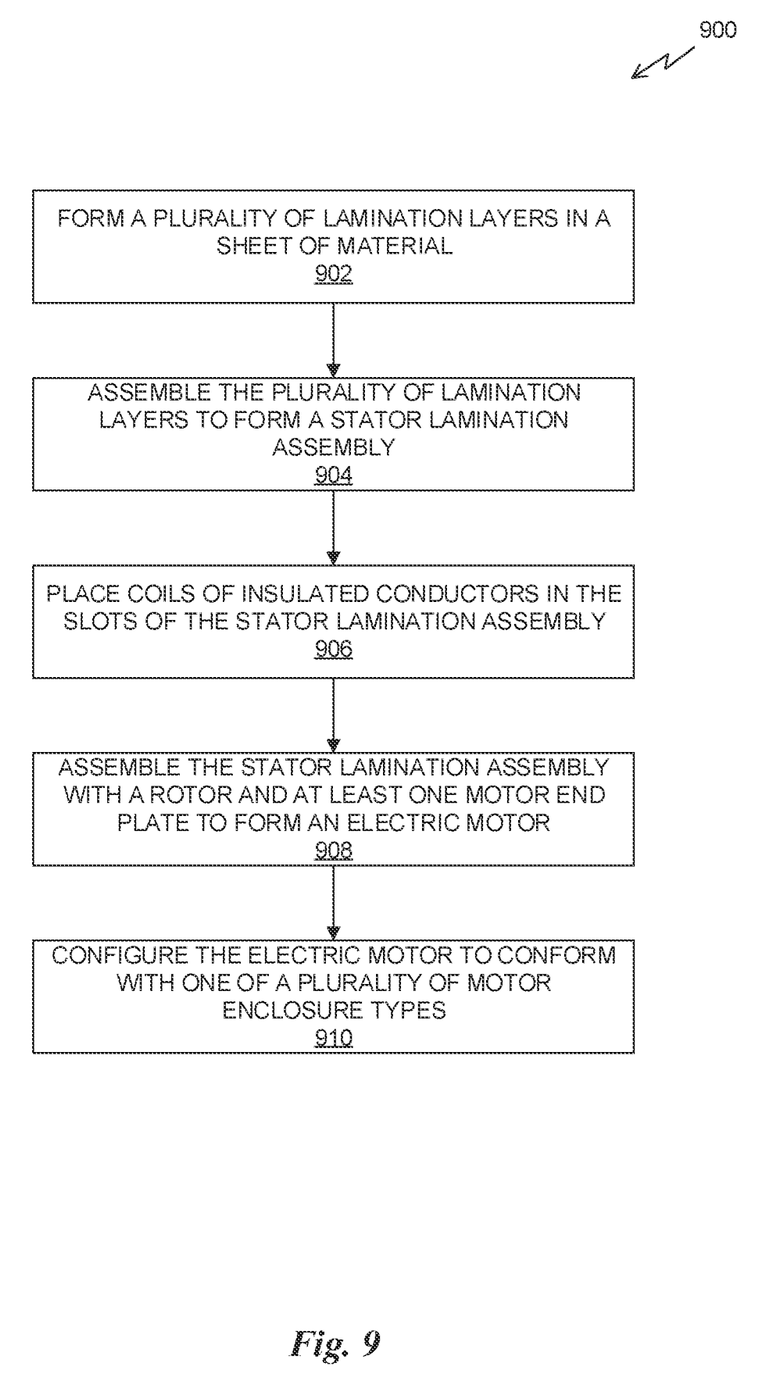
FIG. 9 is a flow diagram of a method for assembling an electric motor using a consolidated stator lamination assembly, in accordance with some embodiments.

FIG. 9 is a flow diagram of a method for assembling an electric motor using a consolidated stator lamination assembly, in accordance with some embodiments. The method 900 can be performed, at least partially, by manufacturing equipment configured to process sheet metal to create a lamination assembly for a stator of the electric motor. For example, the lamination layers can be formed from sheet metal using a die cutting press or a chemical etching machine.

At step 902, a plurality of lamination layers are formed in a sheet of material. In an embodiment, a die cutting press is used to cut out layers having a shape conforming to the profile shown in FIG. 3. The sheet of material can be, e.g., a 24 or 26 gauge sheet of electrical steel, silicon steel, or other ferrous material or alloys thereof. The sheet can be coated with a dielectric material such as a varnish like Remisol C-5. In other embodiments, an oxide layer can be formed on the steel material through various well-known processes in lieu of or in addition to the oxide layer.

In other embodiments, the layers may be formed in the material in other well-known manufacturing processes such as using a waterjet or plasma cutter to cut the layers out of the sheet of material, or using a chemical etching process to form the layers in the sheet of material. The scope of this disclosure is not limited to a particular manner of forming the profile of the layers from the sheet of material.

At step 904, the plurality of lamination layers are assembled to form a stator lamination assembly. In an embodiment, a number of layers suitable to provide a length corresponding to a desired motor capacity (e.g., horsepower) are collected and stacked in a similar orientation. The stack of layers is then fixed using rivets that are disposed in the rivet holes of each of the layers. In an embodiment, the rivets may also be coated with a dielectric material to prevent the rivets from conducting eddy currents across the layers. In other embodiments, the lamination can be formed in other manners such as using bolts disposed in through-holes, via adhesive or through other mechanical means. In some embodiments, the lamination can be painted or varnished, after assembly, to further reduce the chance that eddy currents will be conducted between layers.

At step 906, coils of insulated conductors are placed in the slots of the stator lamination assembly. By connecting the coils to a power source, the magnetic field of the stator can be varied in order to turn the rotor of the electric motor. In an embodiment, the coils are insulated copper wires.

At step 908, the stator lamination assembly is combined with a rotor and at least one motor end plate to form an electric motor. In an embodiment, at least one motor end plate is selected in order to match a desired configuration of the enclosure for the motor.

At step 910, the electric motor is configured to conform with one of a plurality of motor enclosure types. Again, given the selected end plates, a blower and blower motor can be connected to one end plate and covers can be added to the stator lamination assembly to configure the electric motor in conformance with an ODP enclosure type. Alternatively, a fan can be connected to a different end plate in order to configure the electric motor in conformance with a TEFC enclosure type. In yet another alternative, cooling tubes can be added to the recesses between the fins of the stator lamination assembly in order to configure the electric motor in conformance with a TEWC enclosure type. A single consolidated stator lamination assembly can be used for all three of these enclosure type configurations.

It should be understood that the arrangement of components illustrated in the attached Figures are for illustrative purposes and that other arrangements are possible. Moreover, some or all of these other elements may be combined, some may be omitted altogether, and additional components may be added while still achieving the functionality described herein. Thus, the subject matter described herein may be embodied in many different variations, and all such variations are contemplated to be within the scope of the claims.

The use of the terms "a" and "an" and "the" and similar references in the context of describing the subject matter (particularly in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. Furthermore, the foregoing description is for the purpose of illustration only, and not for the purpose of limitation, as the scope of protection sought is defined by the claims as set forth hereinafter together with any equivalents thereof. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the embodiments as claimed.

What is claimed is:

1. A stator for an electric motor, comprising:
a lamination including a plurality of layers, wherein each layer of the plurality of layers has an inner profile and an outer profile and comprises a sheet of material having a nominal thickness, wherein the inner profiles corresponding to the plurality of layers, when assembled into the lamination, form slots dispersed around a hole configured to accept a rotor, and the outer profiles corresponding to the plurality of layers, when assembled into the lamination, include a number of features on an exterior surface of the lamination that enable the electric motor to be configured in accordance with a plurality of enclosure types; and
coils of insulated conductors distributed in the slots,
wherein the number of features on the exterior surface of the lamination includes a retaining feature configured to accept a cover.

2. The stator of claim 1, wherein the plurality of enclosure types comprise at least one of:
an open-drip proof (ODP) enclosure type;
a totally enclosed fan-cooled (TEFC) enclosure type; or
a totally enclosed water-cooled (TEWC) enclosure type.

3. The stator of claim 1, wherein the sheet of material comprises silicon steel or alloys thereof having an oxide layer formed on at least one surface.

4. The stator of claim 1, wherein the number of features on the exterior surface of the lamination includes a plurality of fins, and wherein a shape of the exterior surface of the lamination between a base of a first fin and a base of a second fin conforms to at least a portion of a shape of a cross-section of a cooling tube.

5. The stator of claim 4, wherein the shape of the exterior surface of the lamination between the base of the first fin and the base of the second fin is a curve having a radius that matches a radius of an exterior surface of the cooling tube.

6. The stator of claim 4, wherein the shape of the exterior surface of the lamination between the base of the first fin and the base of the second fin has a number of facets that matches a rectangular cross-section of the cooling tube.

7. The stator of claim 1, wherein the retaining feature comprises a pair of features in the outer profile that are mirrored across a line that intersects a central axis of the stator and passes through an axis of a through-hole in the lamination, wherein the lamination includes a number of through holes used to mount end plates to the lamination to form a motor housing.

8. The stator of claim 1, wherein the cover comprises a base material covered in an elastomeric material, wherein the base material comprises one of a metal, a plastic, or a composite material.

9. The stator of claim 1, wherein the number of features on the exterior surface of the lamination includes a plurality of pairs of retaining features disposed around a central axis of the stator, each pair of retaining features configured to accept a corresponding cover of two or more covers.

10. An electric motor comprising:
a stator comprising:
a lamination including a plurality of layers, wherein each layer of the plurality of layers has an inner profile and an outer profile and comprises a sheet of material having a nominal thickness, wherein the inner profiles corresponding to the plurality of layers, when assembled into the lamination, form slots dispersed around a hole, and the outer profiles corresponding to the plurality of layers, when assembled into the lamination, include a number of features on an exterior surface of the lamination that enable the electric motor to be configured in accordance with a plurality of enclosure types, and
coils of insulated conductors distributed in the slots,
wherein the number of features on the exterior surface of the lamination includes a retaining feature configured to accept a cover;
a rotor disposed in the hole in the lamination of the stator, the rotor coupled to a motor shaft; and
one or more end plates coupled to the lamination of the stator to form a motor housing.

11. The electric motor of claim 10, wherein the cover is one of at least one first cover, the plurality of enclosure types includes an open-drip proof (ODP) enclosure type and, being configured in accordance with the ODP enclosure type, the electric motor further comprises:
a blower attached to at least one end plate of the one or more end plates; and
the at least one first cover disposed on the exterior surface of the lamination of the stator, each cover in the at least one first cover retained by a respective retaining feature included in the number of features on the exterior surface of the lamination, wherein the blower is configured to force air between the at least one first cover and a plurality of fins included in the number of features on the exterior surface of the lamination.

12. The electric motor of claim 10, wherein the plurality of enclosure types includes a totally enclosed fan-cooled (TEFC) enclosure type and, being configured in accordance with the TEFC enclosure type, the electric motor further comprises:
a fan coupled to the motor shaft, wherein the fan is disposed within a shroud coupled to one of the one or more end plates and configured to force air from the fan between a plurality of fins included in the number of features on the exterior surface of the lamination.

13. The electric motor of claim 10, wherein the plurality of enclosure types includes a totally enclosed water-cooled (TEWC) enclosure type and, being configured in accordance with the TEWC enclosure type, the electric motor further comprises:
a plurality of cooling tubes, wherein the number of features on the exterior surface of the lamination includes a plurality of fins and each cooling tube in the plurality of cooling tubes is disposed between a base of a first fin and a base of a second fin in the plurality of fins, and wherein a shape of a profile of the exterior surface of the lamination between the base of the first fin and the base of the second fin conforms to at least a portion of a shape of a cross-section of the cooling tube.

14. The electric motor of claim 10, wherein the sheet of material comprises silicon steel or alloys thereof having an oxide layer formed on at least one surface.

15. The electric motor of claim 10, wherein the cover comprises a base material covered in an elastomeric material, and wherein the base material comprises one of a metal, a plastic, or a composite material.

16. The electric motor of claim 15, wherein the retaining feature comprises a pair of features in the outer profile of each layer that are mirrored across a line that intersects a central axis of the stator and passes through an axis of a particular through-hole in a plurality of through-holes formed in the lamination.

17. A method of manufacturing an electric motor, the method comprising:
forming a plurality of layers in a sheet of material, wherein each layer of the plurality of layers has an inner profile and an outer profile and comprises a sheet of material having a nominal thickness;
assembling the plurality of layers to form a stator lamination assembly, wherein the inner profiles corresponding to the plurality of layers, when assembled into the stator lamination assembly, form slots dispersed around a hole configured to accept a rotor, and the outer profiles corresponding to the plurality of layers, when assembled into the stator lamination assembly, include a number of features on an exterior surface of the stator lamination assembly that enable the electric motor to be configured in accordance with a plurality of enclosure types, wherein the number of features on the exterior surface of the lamination includes a retaining feature configured to accept a cover;
placing coils of insulated conductors in the slots of the stator lamination assembly;
assembling the stator lamination assembly with one or more end plates and a rotor disposed in the hole of the stator lamination assembly to form the electric motor; and
configuring the electric motor to conform to one of the plurality of motor enclosure types.

18. The method of claim 17, wherein the cover is one of at least one first cover, the plurality of enclosure types comprises an open-drip proof (ODP) enclosure type, and configuring the electric motor to conform to one of the plurality of motor enclosure types comprises:
configuring the electric motor to conform to the ODP enclosure type by adding the at least one first cover to the electric motor, each cover in the at least one first cover retained by a respective retaining feature comprising a pair or features on the exterior surface of the stator lamination assembly.

19. The method of claim 17, wherein the plurality of enclosure types comprises totally enclosed water-cooled (TEWC) enclosure type, and configuring the electric motor to conform to one of the plurality of motor enclosure types comprises:
configuring the electric motor to conform to the TEWC enclosure type by attaching at least one cooling tube to the stator lamination assembly, each cooling tube in the at least one cooling tube being disposed between a base of a first fin and a base of a second fin in a plurality of fins included in the number of features on the exterior surface of the stator lamination assembly, and wherein a shape of the exterior surface of the stator lamination assembly between a base of a first fin and a base of a second fin conforms to at least a portion of a shape of a cross-section of a cooling tube.

\* \* \* \* \*